Patented June 5, 1928.

1,672,528

UNITED STATES PATENT OFFICE.

HUGO E. HEISSLER, OF SYRACUSE, NEW YORK, ASSIGNOR TO ATMOSPHERIC NITROGEN CORPORATION, OF SOLVAY, NEW YORK, A CORPORATION OF NEW YORK.

CATALYST FOR THE PRODUCTION OF HYDROGEN.

No Drawing. Application filed March 12, 1926. Serial No. 94,323.

This invention relates to a catalyst adapted to promote the reaction between carbon monoxide and steam, or water vapor, carried in a gas mixture, according to the reaction usually expressed as $CO + H_2O = CO_2 + H_2$. The new catalytic material is characterized by containing as its major ingredient iron and as its minor ingredients potassium and manganese, the catalyst material being preferably in oxide form and deposited on a carrier such as magnesium oxide. The material also possesses the characteristics which flow from or are imparted to material of this nature when subjected in its preparation to a heat treatment of approximately 800° C.

One method of making the catalyst may be set forth as follows: 150 parts by weight of iron nails are dissolved in dilute nitric acid and the solution treated in the hot with an excess of ground magnesite (1260 parts by weight) added gradually to the solution. A small amount of potassium permanganate (about 25 parts by weight) may be added at this stage. The resulting material is in the form of a paste and is dried and then caused to evolve nitrogen oxides and any other gaseous products of heat decomposition by being ignited at temperatures up to 500° C. or 600° C. in a suitable furnace until the evolution of the nitrogen oxides is practically complete. Approximately twenty-four hours may be consumed in this operation. The product is crushed, screened through a twenty-mesh screen, for example, and is then preferably tabletted in accordance with the procedure set forth in patent application, Serial No. 657,817, filed by William Schultze on August 16, 1923. The tabletted material is heated to approximately 800° C. for about three hours. It is now ready for use as catalytic material in the above described process for CO oxidation, operating at a temperature of approximately 500°–600°, which is the customary temperature for this operation when forming part, for example, of the means of forming hydrogen of a mixture of hydrogen and nitrogen for use in a synthetic ammonia process.

The specific procedure adapted for the manufacture of the new catalytic material may be varied in numerous ways. The initial material need not be in the form of iron nails. Any form of metallic iron or any compound of iron of a suitable purity or composition may be used. The product of the mixture of magnesite and the iron nitrate solution or other suitable iron compound may be dried and ignited prior to the addition of the potassium and manganese promoter materials. In that case the ignited product, prepared in the absence of an initially introduced potassium permanganate, may be made up into a paste with a solution of the appropriate amount of potassium permanganate in water, the product being dried and then crushed, screened, and finally tabletted and heated as described. Again the heating of the catalytic material to approximately 800° C. may be applied to the dried material prior to tabletting, as well as to the material in the tabletted form, and where the potassium permanganate is introduced to the original mix, the 800° C. heat treatment may form a part of the treatment during which the nitrogen oxides are driven off from the dried paste which results from the original mix.

The catalytic material thus produced has a specific gravity or density noticeably greater than the specific gravity or density of the same material when only heated to lower temperatures such as temperatures below 650°, and the weight of a given volume of the new material is noticeably in excess of the weight of the same volume of material when prepared at lower temperatures, such for example as temperatures below 650°.

I claim:

1. Catalytic material functioning as such in the production of hydrogen by the reaction between carbon monoxide and steam, and consisting of an oxide material containing iron as its major ingredient and potassium and manganese as minor ingredients, said ingredients being present in said relation throughout the said catalytic material.

2. A catalyst, for the production of hydrogen by bringing together carbon monoxide and steam (at a temperature of approximately 500°–600° C.), which consists of an oxide material containing iron as its major ingredient and potassium and manganese as minor ingredients, said catalyst possessing the characteristics resulting from an exposure of the catalytic material prior to its use to approximately 800° C.

3. Catalytic material functioning as such in the production of hydrogen by the reaction between carbon monoxide and steam, and consisting of an oxide material containing iron potassium and manganese, the iron being greatly in excess of the potassium and manganese, said ingredients being present in said relation throughout said catalytic material.

4. A catalyst substance composed of magnesium oxide bearing catalytic material functioning as such in the production of hydrogen by the reaction between carbon monoxide and steam, said catalytic material consisting of an oxide material containing iron as its major ingredient and potassium and manganese as minor ingredients, said ingredients being present in said relation throughout the said catalytic material.

5. A catalyst tablet composed of compressed particles of magnesium oxide bearing catalytic material functioning as such in the production of hydrogen by the reaction of carbon monoxide and steam, said catalytic material consisting of an oxide material containing iron as its major ingredient and potassium and manganese as minor ingredients, said ingredients being present in said relation throughout the said catalytic material.

In testimony whereof I have hereunto set my hand.

HUGO E. HEISSLER.